United States Patent [19]
Fujimoto

[11] 3,885,234
[45] May 20, 1975

[54] ULTRASONIC WAVE TYPE ALARM DEVICE FOR DEPICTING A MOVING OBJECT

[75] Inventor: Yukio Fujimoto, Yachiyo, Japan

[73] Assignee: Uro Electronics Industries Co., Ltd., Tokyo-to, Japan

[22] Filed: Mar. 13, 1973

[21] Appl. No.: 340,743

[30] Foreign Application Priority Data
Mar. 17, 1972 Japan.............................. 47-32111

[52] U.S. Cl.............................. 340/258 A; 343/7.7
[51] Int. Cl. ............................................ G08b 13/18
[58] Field of Search ........ 340/258 A; 343/5 PD, 7.7

[56] References Cited
UNITED STATES PATENTS

| | | | |
|---|---|---|---|
| 2,794,974 | 6/1957 | Bagno et al..................... | 340/258 A |
| 3,111,657 | 11/1963 | Bagno............................ | 340/258 A |
| 3,465,336 | 9/1969 | Fishbein et al. ................ | 340/258 A |
| 3,665,463 | 5/1972 | Kubanoff........................... | 343/7.7 |

Primary Examiner—Glen R. Swann, III
Attorney, Agent, or Firm—Holman & Stern

[57] ABSTRACT

In an ultrasonic wave type alarm device receiving an ultrasonic wave signal which is transmitted through the air, reflected by a moving object and affected by the Doppler effect (hereinafter referred to as "a Doppler effect signal") and operated by a component of the Doppoer effect signal (referred to as "a Doppler effect signal component" and described in detail later), the difference between the frequency distribution of the Doppler effect signal and that of the normal external noise is utilized to operate its alarm circuit. This alarm device has a first band-pass filter for passing a frequency band including a part of the Doppler effect signal component and a second band-pass filter for passing a frequency band which does not include the Doppler effect signal component, and the difference between the outputs of these band-pass filters is made to be only a part of the Doppler effect signal component so as to eliminate a continuous external noise from a signal received by the alarm device.

3 Claims, 16 Drawing Figures

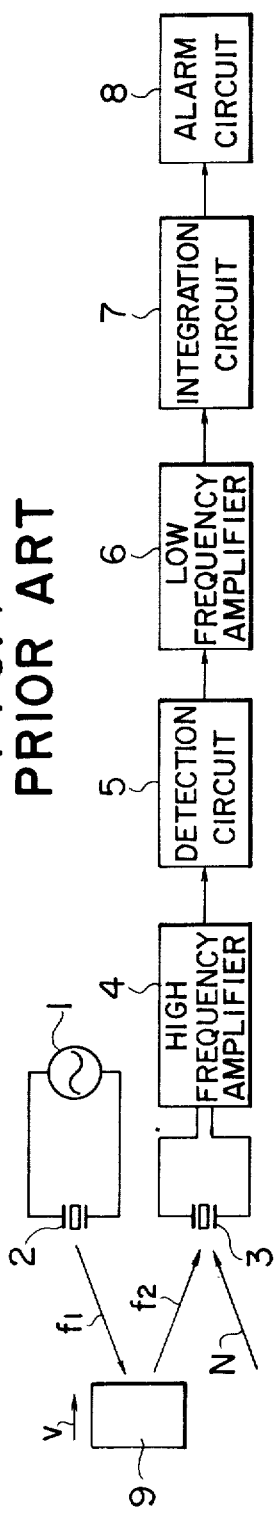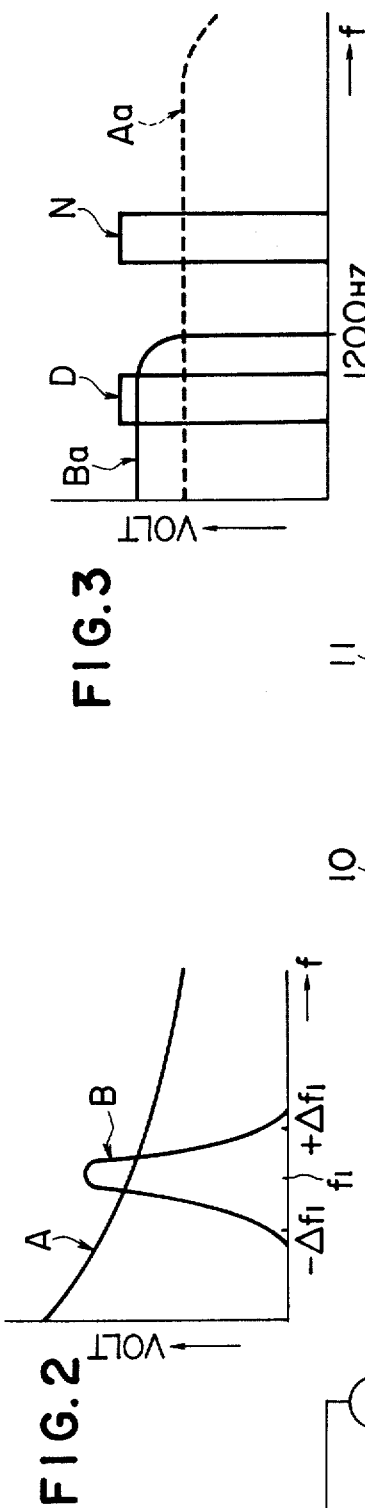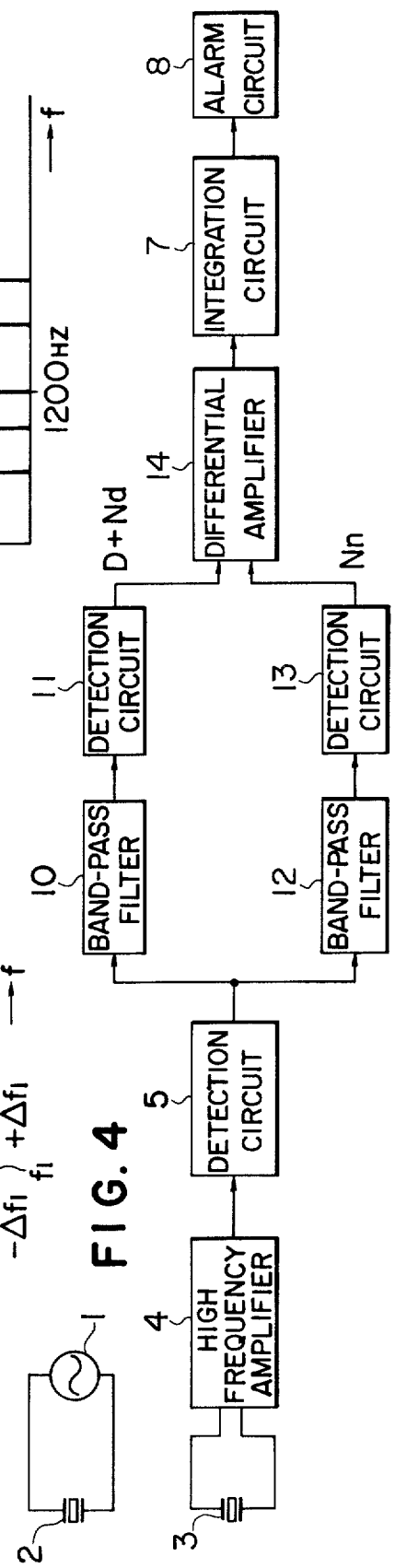

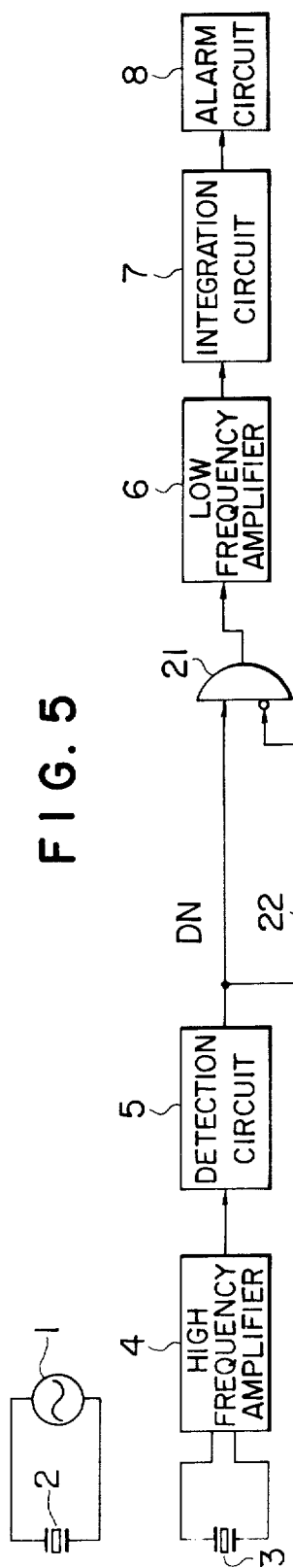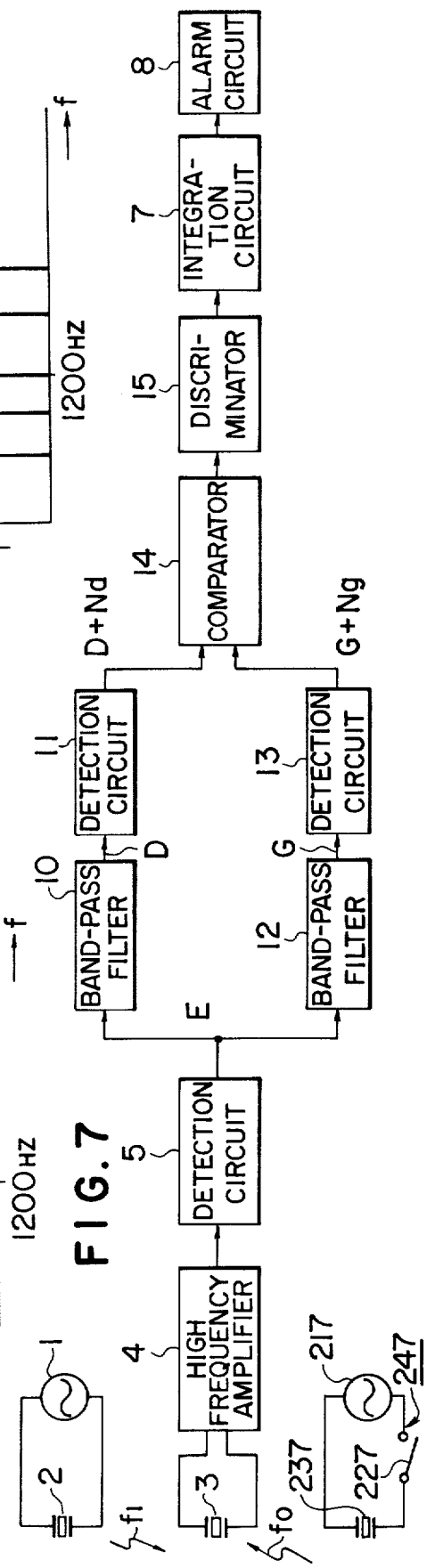

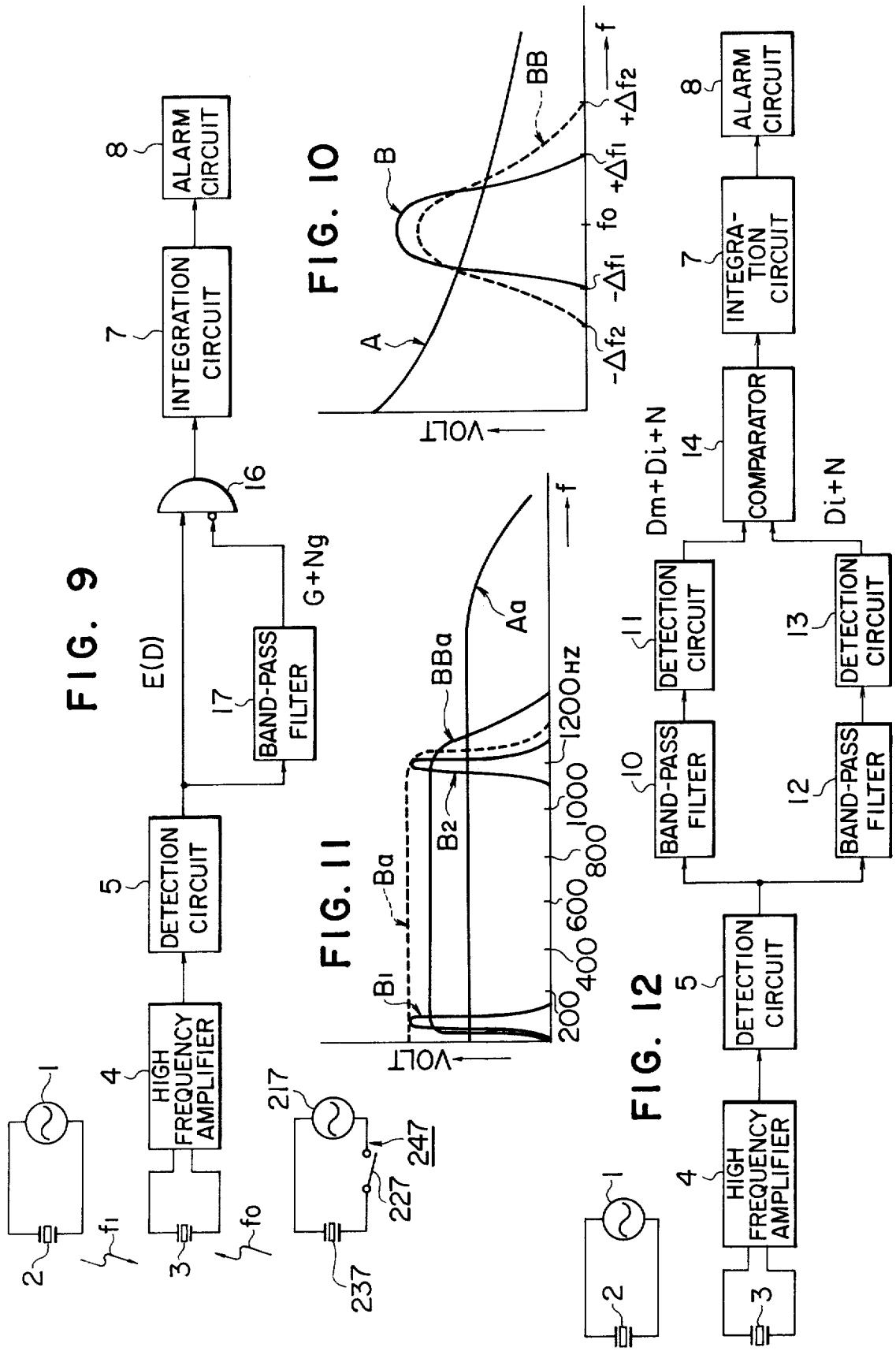

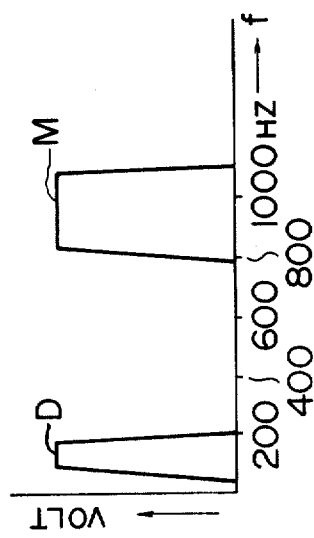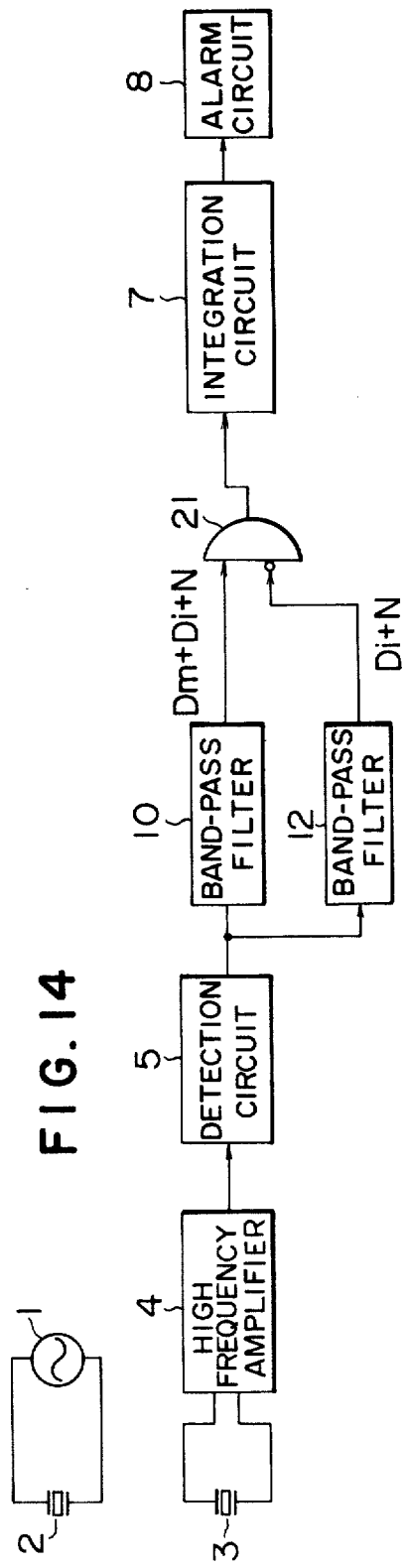

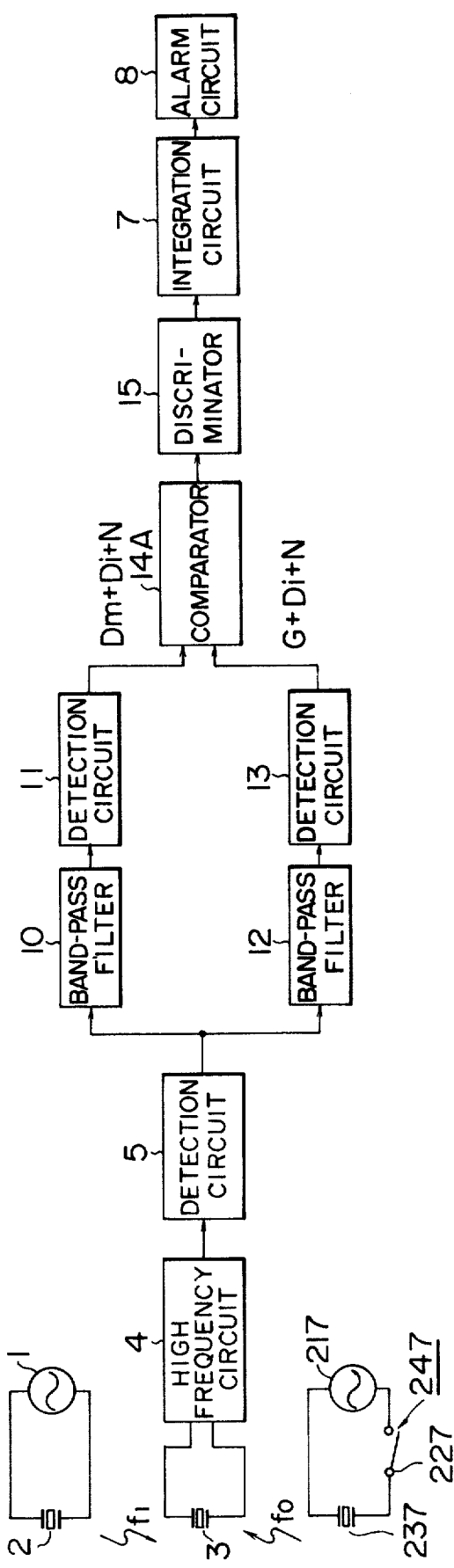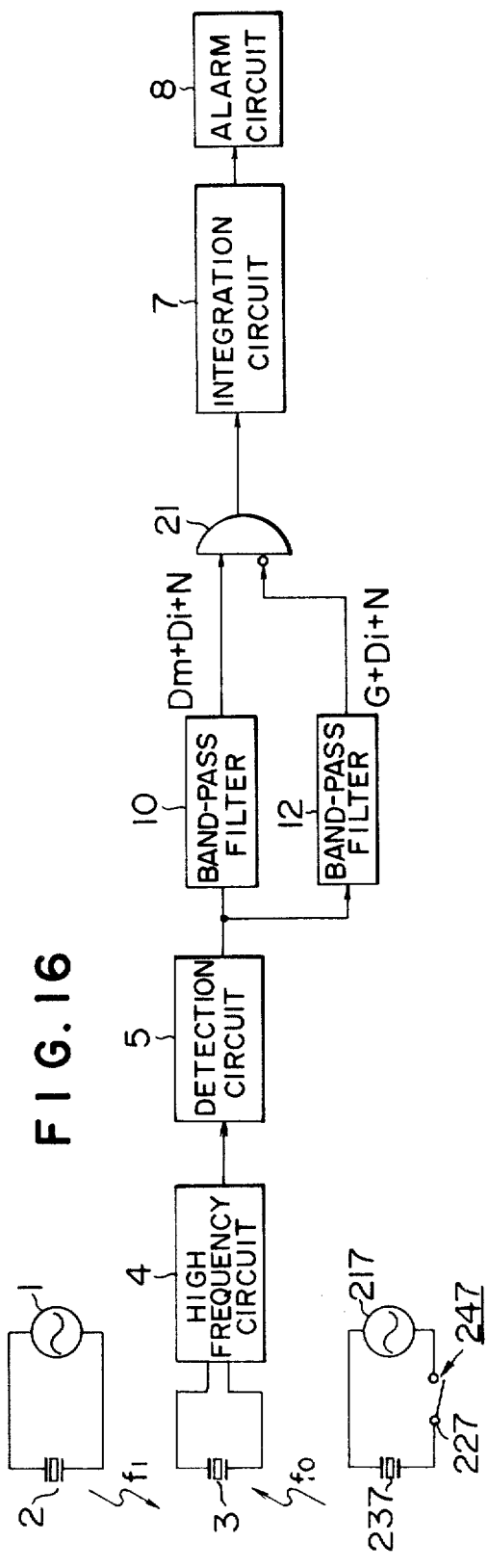

ULTRASONIC WAVE TYPE ALARM DEVICE FOR DEPICTING A MOVING OBJECT

BACKGROUND OF THE INVENTION

This invention relates to ultrasonic wave type alarm devices which detect the presence of a moving object to operate its alarm system on the principle of the Doppler effect affecting an ultrasonic wave.

As conducive to a full understanding of this invention, a conventional ultrasonic wave type alarm device will first be briefly described with reference to FIG. 1.

In the conventional ultrasonic wave type alarm device shown in FIG. 1, an electrical signal from an oscillator 1 is applied to an electro-acoustical transducer 2 for transmitting ultrasonic waves (hereinafter referred to as a transmitting transducer 2), which in turn transmits an ultrasonic wave signal having a single frequency $f_1$ through the air, and an electro-acoustical transducer 3 for receiving ultrasonic waves (hereinafter referred to as a receiving transducer 3) receives ultrasonic waves reflected by an object 9 and produces an electrical signal.

The electrical signal from the receiving transducer 3 is amplified by a high-frequency amplifier 4 and detected through a detection circuit 5 to obtain a low frequency signal. The low frequency signal thus obtained is amplified by a low frequency amplifier 6 and is introduced through an integration circuit 7 to an alarm circuit 8.

In this operation, if the object 9 is at rest, the ultrasonic wave signal having the single frequency $f_1$ from the transmitting transducer 2 will be reflected without change by the object 9. On the other hand, if the object 9 is moving, the ultrasonic wave signal reflected by the object 9 will be changed in frequency due to the Doppler effect.

The difference $\Delta f$ between the frequency of the ultrasonic wave signal from the transmitting transducer 2 and the frequency $f_2$ of the ultrasonic wave signal received by the receiving transducer 3 is represented by the following equation (1):

$$\Delta f = |f_1 - f_2| = \frac{2V}{C} f_1 \qquad (1)$$

where, $C$ is the propagation speed of the ultrasonic wave, and $V$ is the speed at which the object 9 approaches or leaves the transmitting transducer 2.

Thus, if there is an object moving around the ultrasonic wave type alarm device, the difference $\Delta f$ will be obtained through the detection circuit 6 and is then amplified by the low frequency amplifier 6 to operate the alarm circuit 8.

When the object 9 is at rest, then $\Delta f = 0$. Therefore, an output of the detection circuit is a certain value of direct current. Since the direct current is blocked by the low frequency amplifier 6, the alarm circuit 8 will not be operated.

The integration circuit 7 is provided so that the alarm circuit 8 will not be operated by a momentary input signal. If there were no such integration circuit in the ultrasonic wave type alarm device, the alarm circuit 8 would be operated by external noises such as noises caused by switching on or off electrical devices and impact noises. The integration circuit 7 is provided so as to prevent erroneous operation of the alarm circuit caused by the momentary external noise.

In the conventional ultrasonic wave type alarm device having such an organization as described above, momentary impact noises can be satisfactorily controlled by the integration circuit 7. That is, such momentary impact noises do not operate the alarm circuit 8 because of the provision of the integration circuit 7. However, if there are external noises continuously generated by, for instance, automobiles, trains, or airplanes in the vicinity (hereinafter referred to as continuous external noises), the conventional ultrasonic wave type alarm device will carry out erroneous alarm operation.

Furthermore, in the conventional ultrasonic wave type alarm device, the elimination of the external noise is carried out only by the integration circuit 7. Therefore, in the case where the momentary external noise is relatively great, the time constant of the integration circuit 7 must be further increased, which will cause the alarm device to be inoperative with respect to relatively small signals, that is, the sensitivity of the alarm device will be lowered.

In addition, the conventional ultrasonic wave type alarm device detects any moving object which is in the detection area covered by the electro-acoustical transducers 2 and 3 to operate its alarm circuit.

In this connection, in the case where the conventional ultrasonic wave type alarm device is employed as, for instance, a theft prevention device, a power switch thereof must be turned off in advance whenever a patrolling watchman goes through the detection area or whenever the alarm operation is not required. This is a troublesome feature of operation in practice with the conventional ultrasonic wave type alarm device.

Furthermore, in the detection of the presence of a moving object by the utilization of ultrasonic waves reflected from the moving object, the magnitude of the reflected waves received by the ultrasonic wave type alarm device is in proportion to the effective reflection area of the moving object. If the moving object is relatively remote from the alarm device, the effective reflection area thereof will be relatively small and the magnitude of the reflected waves will therefore be small.

Therefore, in the conventional ultrasonic wave type alarm device, when it is necessary to detect a moving object which is spaced relatively apart from the alarm device, or to increase the detection area, the sensitivity of its ultrasonic wave receiving system is increased. However, because of this sensitivity increase, the alarm device will detect movements of insects, such as flies, beetles, cicadas, or moths flying in the vicinity of the alarm device thereby to cause erroneous alarm operations.

SUMMARY OF THE INVENTION

Accordingly, a general object of this invention is to provide a novel ultrasonic wave type alarm device wherein all of the above-described difficulties accompanying the conventional ultrasonic wave type alarm devices can be eliminated.

A second, more specific, object of the invention is to provide an ultrasonic wave type alarm device which is correctly operated by only a Doppler effect signal due to movements of a human body regardless the presence of continuous external noises.

A third object of the invention is to provide an ultrasonic wave type alarm device in which it is not necessary to increase the time constant of its integration circuit.

A fourth object of the invention is to provide an ultrasonic wave type alarm device in which the fact that the frequency spectrum of an external noise is different from that of a Doppler effect signal is utilized to prevent erroneous alarm operation caused by a continuous external noise.

A fifth object of the invention is to provide an ultrasonic wave type alarm device in which only its alarm operation can be automatically suspended, when required, during operation.

A sixth object of the invention is to provide an ultrasonic wave type alarm device in which, even if its sensitivity is increased to broaden its detection area as required, erroneous alarm operation due to insects or the like as well as continuous external noises can be avoided.

The foregoing objects and other objects of the invention will become more apparent from the following detailed description and the appended claims when read in conjunction with the accompanying drawings, in which like parts are designated by like reference numerals and characters.

BRIEF DESCRIPTION OF THE DRAWINGS

In the accompanying drawings:

FIG. 1 is a block diagram illustrating a conventional ultrasonic wave type alarm device;

FIG. 2 is a graphical representation illustrating a relationship between an external noise signal and a Doppler effect signal;

FIG. 3 is a graphical representation for describing the operations of band-pass filters according to the invention;

FIGS. 4, 5, 7, 9, 12, 14, 15, and 16 are block diagrams illustrating various examples of the ultrasonic wave type alarm device according to the invention;

FIG. 6 is a graphical representation illustrating characteristics of a Doppler effect signal;

FIG. 8 is a graphical representation used for a description of the example shown in FIG. 7;

FIGS. 10 and 11 are graphical representations each showing frequency distributions of an external noise signal and Doppler effect signals due to a human body and to an insect; and FIG. 13 is a graphical representation showing characteristics of band-pass filters employed, according to the invention, in the example shown in FIG. 12.

DETAILED DESCRIPTION OF THE INVENTION

As conducive to a full understanding of this invention, a principle which is utilized in the present invention will first be described with reference to FIGS. 2 and 3.

In general, the spectrum of an external noise, as represented by a curve A in FIG. 2, has a voltage distribution wherein the voltage gently decreases with an increase of frequency, while an ultrasonic wave signal subjected to the Doppler effect (hereinafter referred to as a Doppler effect signal) occupies a frequency band width of $f_1 \pm \Delta f_1$. If it is assumed that the maximum speed of the moving object is 5 m/sec, $f_1 = 40$ KHz, and $C = 340$ m/sec in the equation (1) set forth hereinbefore, then $$\Delta f_1 \approx 1,200 \text{ Hz}.$$

(2)

Therefore, when an ultrasonic wave signal $f_2$ reflected by the object 9 is detected by the detection circuit 5, this detection circuit 5 produces an output (hereinafter referred to as a Doppler effect signal component) whose spectrum is as shown by a curve Ba (FIG. 3) covering a frequency band of from 0 Hz to 1,200 Hz. Furthermore, when an external noise is detected by the detection circuit 5, this circuit 5 produces an output which is represented by another curve Aa (FIG. 3) covering a frequency band of from 0 Hz to a frequency higher than 1,200 Hz.

Accordingly, if a first band-pass filter for passing a frequency band D (FIG. 3) which is a part of the Doppler effect signal component (hereinafter referred to as "a particular Doppler effect signal component D") and a second band-pass filter for passing a frequency band N which does not include the Doppler effect signal component are provided after the detection circuit 5, the output of the first band-pass filter will be the sum of the particular Doppler effect signal component D in the frequency band D and a noise signal component Nd in the same frequency band, while the output of the second band-pass filter N will be a noise signal component Nn in the frequency band N (FIG. 3).

Consequently, the magnitudes of power of the noise signal components Nd and Nn can be made substantially equal by appropriately determining the band widths and the gains of these band-pass filters. Then, the difference between the outputs of the band-pass filters will become the particular doppler effect signal component D only.

On the basis of the principle as described above, the invention contemplates the elimination of continuous external noises which may be received by the ultrasonic wave type alarm device.

Shown in FIG. 4 is a block diagram illustrating one example of the ultrasonic wave type alarm device according to the invention, which comprises: an oscillator 1; an electro-acoustical transducer 2 for transmitting an ultrasonic wave signal; an electroacoustical transducer 3 for receiving an ultrasonic wave signal; a high frequency amplifier 4; an integration circuit 7; and an alarm circuit 8, all of which are similar to those described with respect to FIG. 1.

This ultrasonic wave type alarm device further comprises: a band-pass filter 10 for passing the frequency band D whose output is introduced to a differential amplifier 14 through a detection circuit 11; and a band-pass filter 12 for passing the frequency band N whose output is also introduced to the differential amplifier 14 through another detection circuit 13.

The detection circuits 11 and 13 are provided to obtain powers corresponding to the noise signal components Nd and Nn, respectively, because if the outputs of the band-pass filters 10 and 12 were applied directly to the differential amplifier 14, the noise signal component Nd could not be negated by the noise signal component Nn since the noise signal component Nd is different in phase from the noise signal component Nn.

The operation of the ultrasonic wave type alarm device organized as described above is as follows.

When only the Doppler effect signal due to the movement of a human body or the like is received by the electro-acoustical transducer 3, the output of the band-pass filter 10 for the frequency band D is the particular Doppler effect signal component D only, while the output of the band-pass filter 12 for the frequency band N is zero. Therefore, the output of the differential amplifier 14 in this case is a signal corresponding to the particular Doppler effect signal component only, thus operating the alarm circuit 8.

When the electro-acoustical transducer 3 receives the Doppler effect signal and an external noise signal at the same time, the output of the band-pass filter 10 is the sum of the particular Doppler effect signal component D and the noise signal component Nd, or (D + Nd), while the output of the band-pass filter 12 is the noise signal component Nn.

As a result, the output of the differential amplifier 14 is a signal corresponding to (D + Nd − Nn = D), or the particular Doppler effect signal component D, thereby operating the alarm circuit 8.

When the electro-acoustical transducer 3 receives only the noise signal, the output of the band-pass filter 10 for the frequency band D is the noise signal component Nd only, while the output of the band-pass filter 12 for the frequency band N is the noise signal component Nn only. Therefore, the output of the differential amplifier 14 is zero and the alarm circuit 8 is not operated.

Another example of the ultrasonic wave type alarm device according to another aspect of the invention, as shown in FIG. 5 is based on the principle that the spectrum of a continuous external noise is distributed wider than that of the Doppler effect signal.

As is shown in FIG. 5, the circuit of this example is formed by inserting an inhibit gate circuit 21 in the circuit of FIG. 1 between the detection circuit 5 and the low frequency amplifier 6. An output signal DN of the detection circuit 5 is applied through the inhibit gate circuit 21 to the low frequency amplifier 6. Furthermore, the output DN is applied to a band-pass filter 22 connected between the detection circuit 5, and an output FN of the band-pass filter 22 is applied, as an inhibit signal, to the inhibit gate circuit 21.

The passing band of the band-pass filter 22, as shown by reference symbol C in FIG. 6, is determined so that it passes external noise frequency which is higher than $\Delta f = 1,200$ Hz, that is, it does not include the spectrum of the Doppler effect signal component.

The ultrasonic wave type alarm device organized as illustrated in FIG. 5 operates as follows.

When the electro-acoustical transducer 3 receives a continuous external noise, this continuous external noise appears as the output FN of the band-pass filter 22. Due to this output FN, the output DN of the detection circuit 5 cannot go through the inhibit gate circuit 21 and thus the alarm circuit 8 is not operated.

On the other hand, if the continuous external noise disappears, the band-pass filter 22 will not produce its output FN, and the output DN of the detection circuit 5 will therefore be applied through the inhibit gate circuit 21 to the alarm circuit 8.

Thus, erroneous operation of the alarm circuit due to continuous external noises can be prevented.

In the case when there is no external noise in the detection area of the ultrasonic wave type alarm device, the presence of a moving object can be detected and caused to sound an alarm in the same manner as described with respect to FIG. 1.

According to a further aspect of the present invention as illustrated by another example of the ultrasonic wave type alarm device shown in FIG. 7, the alarm operation can be temporarily suspended during the operation of the ultrasonic wave type alarm device.

This example has a device 247 for temporarily suspending an alarm operation (hereinafter referred to as "an alarm suspending device 247") in addition to the oscillator 1 and the electro-acoustical transducer 2 both of which were described with respect to FIG. 1. This alarm suspending device 247 comprises an oscillator 217 of an oscillation frequency $f_o$ which is different from the oscillation frequency $f_1$ of the oscillator 1 and an electro-acoustical transducer 237 connected through a switch 227 to the oscillator 217 and transmitting an alarm operation suspending ultrasonic wave signal of the frequency $f_o$ (hereinafter referred to as "an alarm suspending signal").

Incidentally, as described previously, the Doppler effect signal occupies the band width of $(f_1 \pm \Delta f_1)$, and $\Delta f_1$ is substantially equal to 1,200 Hz, or $\Delta f_1 \approx 12,000$ Hz. When this Doppler effect signal is received and detected through the electro-acoustical transducer 3, the high frequency amplifier 4, and the detection circuit 5 in the same manner as in the example shown in FIG. 1, the spectrum of the output frequency of the detection circuit 5 is distributed, ranging from 0 Hz to 1,200 Hz, as is indicated by curve Ba in FIG. 8.

An output E of the detection circuit 5 is applied to a band-pass filter 10. This band-pass filter 10 is adapted to pass a frequency band Db (FIG. 8) in the spectrum of the output E of the detection circuit 5, that is, the band-pass filter 10 passes the particular Doppler effect signal component D.

On the other hand, the output frequency of the alarm suspending device 247 is determined so that, when it is received and detected by a circuit consisting of the electro-acoustical transducer 3, the high frequency amplifier 4, and the detection circuit 5, the frequency is in a frequency band Gb which is different from the frequency band Db, the latter being occupied by the particular Doppler effect signal component D.

The output E of the detection circuit 5 is further applied to a band-pass filter 12 which passes the frequency band Gb, and an output of the band-pass filter 12 is obtained as an alarm suspending signal component G.

Then, the particular Doppler effect signal component D of the band-pass filter 10 and the alarm suspending signal component G of the band-pass filter 12 are applied respectively through detection circuits 11 and 13 to a comparator 14. In this connection, it should be noted that the power of the alarm suspending signal component G is made sufficiently greater than that of the particular Doppler effect component, and when the comparator 14 receives the particular Doppler effect signal component D only, it produces for instance, a positive d.c. voltage, while when the comparator receives both the particular Doppler effect signal component D and the alarm suspending signal component G, it produces, for instance, a negative d.c. voltage.

The output of the comparator 14 is introduced to a discriminator 15. When the output of the comparator 14 is positive, an alarm circuit 8 is operated through an integration circuit 7. When the output of the comparator is negative or zero, the alarm circuit is not operated.

If the switch 227 is opened so as to stop the transmission of the alarm suspending signal from the alarm suspending device 247, the band-pass filter 12 will receive no alarm suspending signal component G. Therefore, under this condition, when the band-pass filter 10 passes the particular Dopper effect signal component D, the alarm circuit 8 will be operated. Thus, the presence of the moving object can be positively and correctly detected.

Then, if the switch 227 is closed, the band-pass filter 12 will produce the alarm suspending signal component G whose power is sufficiently greater than the particular Doppler effect signal component D, as a result of which the operation of the alarm circuit 8 will be suspended.

One modification of the ultrasonic wave type alarm device shown in FIG. 7 is shown in FIG. 9. As is apparent from a comparison of FIG. 9 with FIG. 7, the modification is achieved by replacing the band-pass filters 10 and 12, the detection circuits 11 and 13, the comparator 14 and the discriminator 15 of FIG. 7 with an inhibit gate circuit 16 and a band-pass filter 17 connected to the inhibit gate circuit 16 and passing the frequency band Gb (FIG. 8).

In this circuit (FIG. 9), the output E of the detection circuit 5 is introduced through the inhibit gate circuit 16 to the integration circuit 7. On the other hand, the output E is applied to the band-pass filter 17, which passes the alarm suspending signal component G, as an inhibit signal, to the inhibit gate circuit 16.

While the alarm suspending signal component G passes the band-pass filter 17, the inhibit gate circuit 16 inhibits the passing of the particular Doppler effect signal component D. Thus, the ultrasonic wave type alarm device shown in FIG. 9 has the same effect as in the example of FIG. 7.

As was described before, the conventional ultrasonic wave type alarm device shown in FIG. 1 receives continuous external noises caused by, for instance, automobiles, trains, or aircraft, thereby carrying out erroneous operation. The spectrum of this continuous external noise is as shown by curve A in FIG. 2. Therefore, the spectrum subjected to detection, ranges from a low frequency including the frequency band Db to a higher frequency including the frequency band Gb.

In the example shown in FIG. 7, a noise signal component Nd in the frequency band Db passes through the band-pass filter 10, while a noise signal component Ng in the frequency band Gb passes through the band-pass filter 12. The noise signal components Nd and Ng, that is, the outputs of the band-pass filters 10 and 12, are detected by the detection circuits 11 and 13, respectively. In this operation, if the outputs of the detection circuits 11 and 13 are made equal in power to each other so that the noise signal components Nd and Ng are nullified by each other, the erroneous operation of the ultrasonic wave type alarm device due to the continuous external noise will not be caused.

In the example shown in FIG. 9, when the continuous external noise is received by the ultrasonic wave type alarm device, the noise signal component Ng in the frequency band Gb is passed through the band-pass filter 17 and applied to the inhibit gate circuit 16, as a result of which the noise signal component is inhibited by the inhibit gate circuit 16. Thus, also in the example of FIG. 9, the erroneous operation of the alarm circuit due to the continuous external noise can be prevented.

Thus, the operations of ultrasonic wave type alarm devices described with respect to FIGS. 7 and 9 can be suspended by controlling the operation of the alarm suspending device 247. Accordingly, such an ultrasonic wave type alarm device can be employed as a theft prevention device. In this case, if a patrolling watchman carrys the alarm suspending device 247 with him during his patrol, the ultrasonic wave type alarm device can be automatically set to suspend its alarm operation on his approaching the patrol area and automatically reset to release the suspension on his leaving the patrol area so as to be ready for generating an alarm indicating the presence of an unauthorized trespasser or a thief.

Hereinafter, according to a still further aspect of the present invention, several examples in which the erroneous operation of the alarm circuit can be prevented even when the sensitivity of the signal receiving system of the ultrasonic wave type alarm device is increased, and there is a continuous external noise therearound, will be described.

The following description relates to one example of the ultrasonic wave type alarm device employed as a theft prevention device.

In the case when a moving object is a human body, according to an experiment a movement of the human body can be represented by the frequency distribution of a reflection wave, or of the Doppler effect signal described previously. That is, the Doppler effect signal of the human body has a frequency band of $f_1 \pm \Delta f_1$, as shown by a curve B in FIG. 10.

On the other hand, since an insect such as a gold beetle, a cicada, a moth or a fly moves faster and more intricately than the human body, its Dopper effect signal, which is shown by a curve BB in FIG. 10, overlaps the Doppler effect signal B of the human body and its skirt spreads somewhat wider than that of the Doppler effect signal A of the human body. However, the Doppler effect signal BB of the insect is very similar in frequency distribution to that (B) of the human.

Therefore, if the Doppler effect signal BB of the insect is low in level and the Doppler effect signal B of the human body is sufficiently high in level, the difference between these two levels can be utilized to extract the Doppler effect signal of the human body only.

However, if the Doppler effect signal of the insect is of approximately the same in level as that of the human body, it is impossible to extract the Doppler effect signal of the human body only.

The conventional ultrasonic wave type alarm device is correctly operated in the case when the Doppler effect signal of the insect is sufficiently lower in level than that of the human to the extent that these Doppler effect signals can be distinguished from each other.

However, in the case when the sensitivity of the conventional ultrasonic wave type alarm device is increased, it will be erroneously operated because the Doppler effect signal of the human body cannot be distinguished from that of the insect.

The term "movement of a human body" used in the specification is defined as motion which a human may undergo when he moves on his foot. For instance, he may move with stealthy steps or run. Therefore, the conventional ultrasonic wave type alarm device intends to detect all motions of the man.

The speed of a man walking with stealthy steps is, in general, of the order of from 0.4 to 1 m/sec. Therefore, if it is assumed that $f_1 = 40$ kHz in the equation (1), the Doppler effect signal of the movement of the man has its peak value around 40 KHz ±80 − 180 Hz. Furthermore, since the speed of a running man is, in general, of the order of 5 m/sec, the Doppler effect signal of the running man has its peak value around 40 KHz ± 1,200 Hz.

In addition, in general, when an intruder sneaks into a house or the like, he moves with stealthy steps and scarcely runs.

Thus, taking into consideration the moving conditions of an intruder who sneaks into a house or the like, it has been found that if the theft prevention device, or the alarm device can detect one of the movements of a man, for instance, the movement of an intruder moving with stealthy steps, it is, in practice, sufficient for the device.

On the other hand, it has been known according to an experiment that the frequency component of the Doppler effect signal of an insect always covers substantially all of the frequency band of 40 KHz ± 80 − 1,300 Hz.

The results of the experiments described above are shown as the outputs of the detection circuit 5 (FIG. 1) in FIG. 11. In FIG. 11, a curve Ba represents the detection output of the Doppler effect signal of a human body and covers the frequency band of from 0 Hz to approximately 1,200 Hz, and a curve $B_1$ represents the detection output of the Doppler effect signal of an intruder moving with stealthy steps and has a frequency band of from 80 Hz to 180Hz, while a curve $B_2$ represents the detection output of the Doppler effect signal of a running man and has a frequency band whose center frequency is 1,200 Hz.

Furthermore, in FIG. 11, a curve BBa with a substantially constant level represents the detection output of the Doppler effect signal BB of an insect and has a frequency band which overlaps the frequency band Ba of the human being and extends beyond Ba. A curve Aa represents the detection output of an external noise such as a sound of a telephone bell. The frequency spectrum of this detection output, as is shown by the curve Aa in FIG. 10, covers a frequency band much wider than those of the Doppler effect signals B and BB. That is, the curve Aa representing the detection output of the external noise sufficiently covers the frequency bands of the curves Ba and BBa and extends higher than Ba and BBa.

One example of the ultrasonic wave type alarm device which is provided on the basis of the study described above is shown in FIG. 12.

This device (FIG. 12) comprises a first band-pass filter 10 for passing a first frequency band which is in the frequency band Ba (in FIG. 11) of the Doppler effect signal of the man and a second band-pass filter 12 for passing a second frequency band which is different from the first frequency band.

As is indicated in FIG. 13, the passing band D of the first band-pass filter 10 is selected to be of, for instance from 80 Hz to 180 Hz in correspondence to the Doppler effect signal component ($B_1$ in FIG. 11) of the man moving with stealthy steps, while the passing band M of the second band-pass filter 12 is selected to be of, for instance, from 800 Hz to 1,100 Hz.

Thus, a signal component representing a sum of a Doppler effect signal component Dm of a man corresponding to the curve $B_1$, the Doppler effect signal component Di of an insect corresponding to the curve BBa, and a noise signal component N, corresponding to the curve Aa is obtained at the output side of the first band-pass filter 10, while a signal component representing the sum of the Doppler effect signal component Di of the insect corresponding to the curve BBa and the noise signal component N corresponding to the curve Aa is obtained at the output side of the second band-pass filter 12.

Then, the outputs of these two band-pass filters 10 and 12 are applied respectively through detection circuits 11 and 13 to a comparator 14, and the resulting output of the comparator 14 is applied through an integration circuit 7 to an alarm circuit 8.

In this operation, the gains of the band-pass filters 10 and 12 are determined in advance according to respective band widths so that the powers of the signal components Di + N respectively included in the outputs of the band-pass filters 10 and 12 are equal to each other, while the detection circuits 11 and 13 operate to integrate ripples included in the signal components Di + N. As a result even if there is a phase difference between the signal components Di + N of the band-pass filters 10 and 12, the phase difference can be eliminated. Thus, the detection circuits 11 and 13 produce signal components Di + N having substantially the same power, which are nullified in the comparator 14.

In the ultrasonic wave type alarm device organized as described above, if a man sneaks into the detection area thereof, the output of the first band-pass filter 10 will be the signal components Dm + Di + N, while the output of the second band-pass filter 12 will be the signal components Di + N, and accordingly the comparator 14 will produce its output corresponding to the signal component Dm, thereby to operate the alarm circuit 8.

In this ultrasonic wave type alarm device, if there is no human body in the detection area, each of the band-pass filters 10 and 12 produces the signal components Di + N only. Therefore, the comparator 14 will produce no output and the alarm circuit 8 will not be operated.

In the latter case, or in the case when there is no man in the detection area, even if what is available is either the signal component Di of the insect or the noise signal component N, the alarm circuit will not be operated due to the same reason as described above.

As is apparent from the above descriptions, in the ultrasonic wave type alarm device shown in FIG. 12, the passing bands of the first band-pass filter 10 and the second band-pass filter 12 are provided in the frequency band of the Doppler effect signal of the man respectively to allow the filters to pass the Doppler effect signal component Dm of the man and the Doppler effect signal component Di of the insect, and the outputs of the two band-pass filters 10 and 12 are compared with each other. Thus, erroneous operation of the ultrasonic wave type alarm device will not be caused by the moving insect or the external noise.

The numerical values of the passing bands described above in respect to FIG. 12 are not intended to be limitative. That is, these values can be replaced by various combinations of numerical values, if they are selected, according to the use of the ultrasonic wave type alarm device, in such a manner that the passing band of the first band-pass filter 10 is in a particular part of the frequency band of the Doppler effect signal A of the moving object, and the passing band of the second band-pass filter 12 is in the rest of the frequency band of the Doppler effect signal A.

One modification of the ultrasonic wave type alarm device shown in FIG. 12 is illustrated in FIG. 14.

This modification can be achieved by replacing the detection circuits 11 and 13 and the comparator 14 of FIG. 12 with an inhibit gate circuit 21. The output of the band-pass filter 12 is applied, as an inhibit gate signal, to the inhibit gate circuit 21. When the signal components Di and N are not available at the output side of the second band-pass filter 12, the signal component Dm obtained at the output side of the first band-pass filter 12 is introduced through the integration circuit 7 to the alarm circuit 8.

Since the ultrasonic wave type alarm device has an organization as described above, if the signal component Di and/or N is available at the output side of the band-pass filter 12, no input will be applied to the integration circuit 7. Accordingly, erroneous operation of the alarm circuit will never be caused by a moving insect or an external noise.

Furthermore, in FIG. 14, the band-pass filter 10 can be omitted, and, instead, the output of the detection circuit 5 can be connected directly to the inhibit gate 21.

In the examples of FIGS. 12 and 14, any moving object in the detection area is detected and causes an alarm to be generated. However, in the case where the ultrasonic wave type alarm device is utilized as a theft prevention device, it is desirable that it will not generate an alarm with respect to a patrolling watchman. Therefore, the ultrasonic wave type alarm device should be designed so that its alarm operation can be suspended when required.

In order to meet this requirement, another modification of the ultrasonic wave type alarm device of FIG. 12 is illustrated in FIG. 15.

The main circuit of this modification can be formed by replacing the comparator 14 of FIG. 12 with a comparator 14A comprising a differential amplifier and with a discriminator 15.

In addition to the main circuit, an alarm suspending device 247 such as that described with respect to FIG. 7 is provided.

The oscillation frequency $f_o$ of the oscillator 237 is predetermined to be a frequency within the passing band M (FIG. 13) of the band-pass filter 12. Therefore, when the main circuit of the alarm device shown in FIG. 15 receives an alarm suspending signal of the oscillation frequency $f_o$ from the alarm suspending device 247, a signal component G is obtained at the output side of the band-pass filter 12 and is then applied through the detector 13 to the comparator 14A.

In this connection, it should be noted that the ultrasonic wave type alarm device (FIG. 15) is so designed that the power of the signal component G is sufficiently greater than that of the Doppler effect signal component Dm, as previously described, so that the comparator 14A will produce, for instance, a positive d.c. voltage when it receives only the Doppler effect signal component Dm, while it will produce, for instance, a negative d.c. voltage when it receives both the Doppler effect signal component Dm and the signal component G.

The discriminator 15 operates in such a manner that, when an output of the comparator 14A is positive, it will operate the alarm circuit 8 through the integration circuit 7, and when the output is negative or zero, it will not operate the alarm circuit 8.

In the example shown in FIG. 15, if the switch 227 of the alarm suspending device 247 is opened so that no alarm suspending signal is transmitted, the band-pass filter 12 will receive no alarm suspending signal component G. Under this condition, since the Doppler effect signal components Di of the insect and the noise signal components N in the band-pass filters 10 and 12 are in balanced state or are equal, it will follow that the alarm circuit is operated only when the Doppler effect signal component Dm of the man is obtained at the output side of the detection circuit 5.

On the other hand, if the switch 227 is closed so as to transmit the alarm suspending signal, the band-pass filter 12 will obtain the alarm suspending signal component G. As a result, the alarm operation of the ultrasonic wave type alarm device, that is, the operation of alarm circuit will be suspended regardless of the presence of the Doppler effect signal component Dm of the human body.

Since the first band-pass filter 10 and the second band-pass filter 12 which have respective passing bands in the frequency band of the Doppler effect signal of the intruder are provided in the example shown in FIG. 15, this examples has the same effect as described with respect to FIG. 12 and can simply suspend its alarm operation when required.

Similarly as in the effects described with respect to FIGS. 7 and 9, the example shown in FIG. 15 can be employed as, for instance, a theft prevention device. In this case, if a watchman carries the alarm suspending device 247 with him during his patrol, the ultrasonic wave type alarm device will be automatically set to suspend its alarm operation upon his approaching the patrol area and automatically reset to release the suspension on his leaving the patrol area.

One modification of the ultrasonic wave type alarm device shown in FIG. 15 is illustrated in FIG. 16.

This modification can be achieved by replacing the detection circuits 11 and 13, the comparator 14A and the discriminator 14 of FIG. 15 with an inhibit gate circuit 21, or by the provision of the alarm suspending device 247 in the example shown in FIG. 14.

In FIG. 16, when the alarm suspending signal component G is produced at the output side of the band-pass filter 12, the inhibit gate circuit 21 inhibits the passing of the Doppler effect signal component Dm. The example shown in FIG. 16 has the same functions as those described with respect to FIG. 14, and similarly as in the example of FIG. 15 can automatically be set to suspend and reset its alarm operation.

In FIG. 16, the band-pass filter 10 may be omitted so as to connect the output of the detection circuits directly to the inhibit gate circuit 21.

In the examples described above, various countermeasures have been taken against the Doppler effect signal of the insect on the basis that the frequency distribution of the Doppler effect signal of the insect overlaps that of the man. In this connection, it has been found as the result of an experiment that the movement of air such as ventilating air supplied from an air conditioning device causes a Doppler effect phenomenon similar to that of the insect. The invention can be applied also to such a false Doppler effect signal whose frequency distribution is similar to that of the Doppler effect signal of an intruder.

The examples shown in FIGS. 12 and 15 have been described on the basis that the signal components Di and N contained in the output of the detection circuit 5 are substantially constant in level over respective frequency bands as shown in FIG. 11. In practice, however, the false Doppler effect and the external noise signal are frequently not constant in level over respective frequency bands. Therefore, amplifiers or attenuators may be provided in the path of the signal components Di + N, for instance, at the output sides of the band-pass filters 10 and 12 so as to control the levels of the signal components Di + N.

I claim:

1. In an alarm apparatus wherein an ultrasonic wave is transmitted through the air and reflected by a moving person to create a Doppler effect signal falling within a given range of frequencies corresponding to the Doppler effect signal components of a moving person, and wherein an alarm is normally triggered in response to the presence of a received Doppler effect signal falling within said given range of frequencies, the improvement enabling said apparatus to reject (1) received Doppler effect signals caused by noise and having frequency components falling both within and beyond said given range of frequencies, and (2) received Doppler effect signals caused by an object other than a moving person and having frequency components substantially co-extensive with said first range of frequencies, said improvement comprising:

a first band-pass filter means operable upon a received Doppler effect signal for passing only a first band of relatively low frequency components within said given frequency range corresponding to the Doppler effect signal components of a person moving at a speed of approximately .4 to 1 meters per second;

a second band-pass filter means operable upon a received Doppler effect signal for passing a second band of frequency components different than and relatively higher than said first band and falling within said given frequency range;

means responsive to the difference between the outputs of said first and second band-pass filters for generating a difference signal representative thereof; and means responsive to said difference signal for triggering an alarm.

2. An ultrasonic wave type alarm device as claimed in claim 1, wherein said means responsive to the difference between the outputs of said first and second band-pass filters for generating said difference signals comprises a comparator circuit connected to the outputs of said band-pass filters.

3. An ultrasonic wave type alarm device as claimed in claim 2, further comprising a first detector circuit connected between said first band-pass filter and said comparator circuit, and a second detector circuit connected between said second band-pass filter and said comparator circuit, said first and second detector circuits being constructed to produce at the output of said comparator circuit said difference signal.

* * * * *